United States Patent [19]

Skostins

[11] 4,252,709

[45] Feb. 24, 1981

[54] HANDLING ADDITIVE FOR SILICONE ELASTOMERS COMPRISING BORIC ACID AND ETHYLENE GLYCOL OR GLYCEROL

[75] Inventor: Olgerts Skostins, Midland, Mich.

[73] Assignee: Dow Corning Corporation, Midland, Mich.

[21] Appl. No.: 21,649

[22] Filed: Mar. 19, 1979

[51] Int. Cl.$^3$ .......................... C08L 83/04; C08J 3/20
[52] U.S. Cl. ................................. 260/33.4 SB; 252/1
[58] Field of Search ...................... 260/33.4 SB; 252/1

[56] References Cited

U.S. PATENT DOCUMENTS

| | | | |
|---|---|---|---|
| 2,541,851 | 2/1951 | Wright | 260/33.4 SB |
| 2,579,332 | 12/1951 | Nelson, Jr. | 260/33.4 SB |
| 2,644,805 | 7/1953 | Martin | 260/33.4 SB |
| 2,721,857 | 10/1955 | Dickmann | 260/37 SB |
| 3,070,560 | 12/1962 | Metevia, et al. | 260/33.4 SB |
| 3,677,997 | 7/1972 | Kaiser, et al. | 260/33.4 SB |
| 3,730,938 | 5/1973 | Smith, Jr. et al. | 260/33.4 SB |

*Primary Examiner*—Joseph L. Schofer
*Assistant Examiner*—Peter F. Kulkosky
*Attorney, Agent, or Firm*—Edward C. Elliott; Roger H. Borrousch

[57] ABSTRACT

A handling additive composition increases the plasticity and reduces the stickiness of commercial silicone elastomer bases when it is added to them. The composition is obtained by mixing boric acid, polyhydroxy alcohol and filler.

8 Claims, No Drawings

HANDLING ADDITIVE FOR SILICONE ELASTOMERS COMPRISING BORIC ACID AND ETHYLENE GLYCOL OR GLYCEROL

BACKGROUND OF THE INVENTION

1. Field of the Invention

This invention relates to additives to improve the handling of silicone elastomers prepared from polydiorganosiloxanes having Williams plasticity of greater than 0.5 mm and being cured with organic peroxide vulcanizing agents.

2. Description of the Prior Art

Silicone elastomer bases commonly are produced from a polydiorganosiloxane of gum consistency, reinforcing fume silica, an anti-crepe aging material, and many additional additives to modify the properties of the base or the cured silicone elastomer obtained from the base. To achieve desirable physical or electrical properties of the cured silicone elastomer, certain combinations of ingredients are used to prepare the composition of the silicone elastomer base. These bases may not have the most desirable handling properties, that is, it may be softer or tackier than is desired for easy handling or further processing in equipment such as two roll mills, extruders or calenders.

An answer to such problems was disclosed in U.S. Pat. No. 2,721,857 by Dickmann who disclosed the addition of 0.005 to 0.090 parts by weight, based on 100 parts by weight of the organopolysiloxane of, boric acid, boric acid anhydride or alkyl borates. Amounts outside those shown were stated to be inoperative. This boron compound was added to the silicone elastomer stock during its manufacture.

Metevia disclosed in U.S. Pat. No. 3,070,560 that a combination of hydroxylated siloxane and boron in the form of alkyl borates, organosilyl borates, boric acid or boric oxide would improve the handling properties of silicone rubber stock made with the fillers described in U.S. Pat. No. 2,863,846 by Tyler. The hydroxylated siloxane and boron compound were added to the stock during its manufacture. Metevia stated that it was desirable to heat the ingredients of the invention after they have been mixed together at temperatures of 100° to 200° C. for 1 to 3 hours.

Using the technology disclosed by these patents has disclosed problems. The alkyl borates when added to a silicone elastomer base on a mill can give off volatile by-products which present a distinct hazard from fire. When boric acid or boric oxide is used as an additive to a silicone elastomer base on a mill, the reaction rate is so slow that the desired improvement in plasticity and surface tack may not occur for many days.

SUMMARY OF THE INVENTION

The composition of this invention is an additive which can be added to a silicone elastomer base after the manufacture of the base to improve the plasticity and handling qualities of the resultant silicone elastomer stock. The composition is obtained by combining boric acid, polyhydroxy alcohol, and filler.

Shearing a mixture of the composition of this invention and a conventional silicone elastomer base improves the handling qualities of the resulting silicone elastomer stock. The homogeneous silicone elastomer stock produced has a higher plasticity and less tack than the original silicone elastomer base.

DESCRIPTION OF THE INVENTION

This invention relates to a composition consisting essentially of the product obtained by combining (a) 100 parts by weight boric acid, (b) 100 to 300 parts by weight polyhydroxy alcohol selected from the group consisting of ethylene glycol and glycerol, and (c) 10 to 400 parts of filler.

The ingredients used in the composition of this invention are all easily obtainable commercial materials. The boric acid, $B(OH)_3$, is a low cost source of boron that is at least partially soluble in the polyhydroxy alcohols used in this invention. In order for the composition of this invention to improve the handling characteristics of the silicone elastomer base to which it is added the boric acid must be at least partially soluble in the polyhydroxy alcohol used. If the boric acid is used with a material in which it is not at least partially soluble, the rate of improvement in the handling qualities is severely retarded.

The polyhydroxy alcohol used is selected from the group consisting of ethylene glycol and glycerol. The boric acid is more soluble in ethylene glycol than in glycerol. The maximum solubility of boric acid in glycerol is approximately 28 g of boric acid per 100 cc of glycerol at room temperature. If glycerol is the polyhydroxy alcohol used in the composition of this invention, the silicone elastomeric stock resulting from practicing the process of this invention has a particularly desirable "waxy" characteristic if the silicone elastomer base contains phenyl radicals. The composition of this invention may contain a mixture of both ethylene glycol and glycerol in order to produce a composition that dissolves the boric acid and also imparts the most desirable surface characteristics to the greatest extent.

The filler is present in the composition of this invention in order to control the viscosity of the composition. For maximum ease in dispersing the composition uniformly throughout the silicone elastomer base to which it is added, the composition of this invention should have a viscosity approximating the viscosity of the base. Such viscosities may be obtained by adding a very finely divided reinforcing filler, such as fume silica with a surface area of 250 $m^2/g$ for instance, in amounts as low as 10 parts of filler by weight per 100 parts by weight of boric acid. It is possible to use as high as 400 parts of filler by weight per 100 parts by weight of boric acid if a filler such as ground quartz with an average particle size of 5 micrometers is used. The amount of filler is not critical in that it is used only to control the viscosity of the composition of this invention. Desirable fillers include fume silica, wet process silica, ground quartz, diatomaceous earth, finely ground titanium dioxide, and finely ground alumina.

The composition of this invention is produced by mixing the ingredients together at room temperature to form a homogeneous, paste consistency product. The shearing necessary to accomplish this may take place in such equipment as a dough mixer, a 2 roll mill, a three roll mill, or a compounding extruder. If the ratio of boric acid to polyhydroxy alcohol is such that the boric acid is completely soluble, the resulting single phase only needs to be uniformly distributed with the filler. When fume silica was used as the filler it was only necessary to shear in a dough mixer in order to yield a homogeneous product. When an excess of boric acid is used over that which is soluble in the polyhydroxy alcohol, it can be necessary to use a high shear mixer such as 3 roll mill in order to obtain a homogeneous blend of the boric acid, alcohol, and filler.

The composition of this invention should have a viscosity high enough to prevent seperation of the ingredients during storage prior to use. The viscosity should not be so high that it is difficult to disperse the composition in the silicone elastomer base. The viscosity of the composition may change during storage but it is not critical as long as the composition can be properly dispersed when it is used.

The composition of this invention can be used to improve the handling properties of the common commercial silicone elastomer bases presently available. Such bases comprise polydiorganosiloxane of gum consistency, reinforcing filler, anti-crepe aging agent, and assorted ingredients to modify such properties as heat aging, compression set, fluid resistance, flame resistance, and color. It has been found that the composition of this invention is most effective when the silicone elastomer base contains at least some hydroxyl endblocked polydiorganosiloxane fluid. In bases which contained a low amount of hydroxyl fluid the plasticity did not increase as rapidly or as much as those that contained higher levels of hydroxyl radical. It has also been found that if the polyhydroxy alcohol of the composition of this invention is not used, the effectiveness of the composition is greatly reduced.

The composition of this invention improves the handling qualities of the silicone elastomer base in which it is dispersed in two ways. The viscosity of the base is raised giving a material that is easier to handle in that the resulting stock has more "body" and less tendency to stretch and flow during handling operations. The surface "tack" or stickiness of the base is reduced, thus reducing the tendency of the base to stick to surfaces such as containers, process rolls, extruder dies, etc.

The process of this invention comprises shearing the composition of this invention and a silicone elastomer base together to produce a homogeneous stock that has improved handling properties. The shearing is normally done on a two roll rubber mill which is also used to convert the base into a stock ready for curing by adding organic peroxide vulcanizing agent and modifiers such as flame retardant additives and coloring pigments. The composition of this invention can be added at any time during the process of mixing the above ingredients as long as it is thoroughly dispersed during the remainder of the process. It is desirable to add the composition of this invention first as it will then be easier to add the remaining ingredients because of the improved handling of the material being mixed.

The silicone elastomer base used in the process of this invention commonly has a viscosity greater than a Williams plasticity of 0.5 mm. Lower viscosity bases are normally mixed on different types of equipment and do not need the type of handing improvement imparted by this process.

The amount of composition of the instant invention used in this process is determined by the result desired and by the nature of the silicone elastomer base being used. If too little composition is used, for instance less than 0.1 part by weight per 100 parts by weight of base, the effect will be small or take a long time, for instance a matter of days, to become effective. Higher levels of composition, above 1.0 parts, are unnecessary as the handling properties will be only marginally improved by extra amounts and too much handling additive composition will effect the physical properties of the cured silicone elastomer. A desirable level in most cases is from 0.1 to 0.5 part by weight of composition of this invention per 100 parts by weight of silicone elastomer base.

The organic peroxide used in this process can be any of the well-known commercial peroxides used to vulcanize silicone elastomers. The amount of organic peroxide used is determined by the nature of the curing process, the organic peroxide used, and the silicone elastomer base used. These considerations are well-known to those skilled in the art of silicone elastomers. Typical organic peroxides are 2,4-dichlorobenzoyl peroxide, benzoyl peroxide, ditertiarybutyl peroxide, dicumyl peroxide, and 2,5-bis(tert-butyl peroxy)-2,5-dimethylhexane.

The catalyzed silicone elastomer stock is cured by heating to a temperature above the activation temperature of the organic peroxide catalyst chosen for a period of time sufficient to vulcanize the stock to the point desired. Before heating, the stock is formed into the desired shape by the common steps of molding, extruding, calendering, or other such forming operation. Such steps and procedures are well-known in the art.

The following examples are included for illustrative purposes only and should not be construed as limiting the invention which is properly delineated by the claims. All parts are parts by weight.

EXAMPLE 1

A series of compositions were prepared to test their effectiveness in improving the handling of typical silicone elastomer bases.

A. A composition of 2.3 parts of glycerol, 1 part of boric acid, and 1 part of finely ground alumina was hand mixed to a paste, then passed through a 3 roll mill to yield a well-dispersed, homogeneous composition.

B. A composition of 2.3 parts of glycerol, 1 part of boric acid, and 4 parts of ground quartz with an average particle size of 5 micrometers was prepared as in A.

C. A composition of 2.3 parts of glycerol, 1 part of boric acid, and 0.5 part of fume silica with a surface area of 250 m$^2$/g was prepared as in A.

D. A composition of 50 parts of ethylene glycol, 50 parts of boric acid and 12.5 parts of the fume silica of C were mixed in a dough mixer. The boric acid dissolved rapidly in the ethylene glycol in an endothermic reaction. The resulting composition was smooth and homogeneous without passing through a 3 roll mill.

EXAMPLE 2

The above compositions for improving handling were evaluated in a commercial silicone elastomer base described as a soft, off-white, 30 durometer silicone rubber base for use in compounding general purpose silicone rubber stocks. The base was described as type VMQ under ASTM D1418.

The amounts of composition shown in Table I were added to 100 parts of the above base on a two roll mill and sheared until a uniform mixture was obtained. The mixture was removed from the mill and formed into samples for measuring plasticity in accordance with ASTM D926. The sample weight was twice the specific gravity. The plasticity of the sample was then measured 1 hour after the sample was mixed and formed.

The results in Table I show that the plasticity of the base was increased by the addition of the compositions. The higher plasticity made the materials easier to handle. In addition the use of mixture A, B, and C containing glycerol gave the final mixture a non-tacky, "waxy" feel.

TABLE I

| Composition | Amount Parts | Plasticity mm |
|---|---|---|
| A | 0 | 1.83 |
| A | 1.0 | 2.18 |
| B | 1.0 | 2.13 |
| C | 0.5 | 2.13 |
| C | 1.0 | 2.16 |
| D | 0.1 | 1.96 |
| D | 0.5 | 2.16 |
| D | 1.0 | 2.16 |

EXAMPLE 3

Composition D of Example 1 was added to a commercial silicone elastomer base described as a 45 durometer silicone rubber base for use in compounding general purpose silicone rubber stocks. The base was a soft, translucent material and was described as Type VMQ under ASTM D1418.

The amounts of composition D shown in Table II were added to 100 parts of the above base on a two roll mill, sheared until uniform and then tested as in Example 2. The results in Table 2 show that the plasticity of the base was increased.

TABLE II

| Amount of D Part | Plasticity mm |
|---|---|
| 0 | 1.96 |
| 0.5 | 2.62 |
| 1.0 | 2.62 |

EXAMPLE 4

Each of the compositions described in Example 1 was added in the amount shown in Table III to a commercial silicone elastomer base described as a 50 durometer siicone rubber base that cured to give a material with high tensile and tear strength. The base was described as Type VMQ under ASTM D1418.

The amounts of composition shown in Table III were added to the above base on a two roll mill and sheared until a uniform mixture was obtained. The mixtures were then tested as in Example 2. The results in Table IV show that the plasticity was increased in each case.

TABLE III

| Composition | Amount Parts | Plasticity mm |
|---|---|---|
| A | 0 | 2.26 |
| A | 1.0 | 2.54 |
| B | 1.0 | 2.51 |
| C | 1.0 | 2.44 |
| D | 1.0 | 2.51 |

EXAMPLE 5

Each of the compositions of Example 1 was added in the amount shown in Table IV to a commercial silicone elastomer base described as a 40 durometer extreme low temperature silicone rubber base. The base was type PVMQ under ASTM D1418.

The amounts of composition shown in Table IV were added to the above base on a two roll mill and sheared until a uniform mixture was obtained. The mixtures were then tested as in Example 2. The results in Table IV show that the plasticity was increased in each case. Mixtures made with compositions A, B, and C gave the final mixtures a particularly non-tacky, "waxy" feel.

TABLE IV

| Composition | Amount Parts | Plasticity mm |
|---|---|---|
| A | 0 | 1.85 |
| A | 1.0 | 2.44 |
| B | 1.0 | 2.31 |
| C | 1.0 | 2.31 |
| D | 0.1 | 2.36 |
| D | 0.5 | 2.62 |
| D | 1.0 | 2.64 |

A mixture of 10% boric acid by weight in polydiorganosiloxane gum added in the amount of 1 part of mixture to 100 parts of the above base resulted in a plasticity of 1.98 mm.

EXAMPLE 6

A composition E was prepared by mixing in a dough mixer 100 parts of glycerol, 100 parts of ethylene glycol, 200 parts of boric acid, and 150 parts of fume silica with a surface area of approximately 250 $m^2/g$. This composition was a smooth uniform stiff paste when removed from the mixer. After standing, it became stiffer and crumbled when a portion was removed from its container. When worked slightly between the fingers, the material became a smooth, soft paste.

Additional silicone elastomer bases were used for test with this composition. Base 6 was a commercial 35 durometer silicone rubber base designed for compounding with a variety of extending fillers and vulcanizing agents. Base 6 was a type VMQ under ASTM D1418.

Base 7 was a commercial 40 durometer silicone rubber base designed to yield stocks that reach a balance of properties after press molding or hot air vulcanizing without the necessity of a post cure. Base 7 was a type VMQ under ASTM 1418.

Base 8 was a commercial 80 durometer silicone rubber base of the same type as Base 7.

The composition E was mixed with 100 parts of each base as shown in Table V in the amount shown by shearing with a two roll mill. After a uniform mixture was obtained, the mixtures were tested as in Example 2. In addition, the Williams plasticity was also measured after a 3 day period. The data shows that the plasticity was raised in each case.

In each case, as the plasticity of the base increased, the surface tack or stickiness of the mixture decreased yielding a material that was improved in handling characteristics.

TABLE V

| Base | Plasticity, mm | | | | |
|---|---|---|---|---|---|
| | After 1 Hour | | | After 3 Days | |
| | Amt. of E | | | | |
| | 0 | 0.5 | 1.0 | 0.5 | 1.0 |
| 2 | 1.78 | 2.11 | 2.13 | 2.24 | 2.24 |
| 3 | 1.78 | 2.51 | 2.64 | 2.72 | 2.74 |
| 4 | 2.54 | 2.67 | 2.67 | 2.84 | 2.87 |
| 5 | 1.80 | 2.11 | 2.16 | 2.31 | 2.36 |
| 6 | 1.70 | 1.96 | 2.03 | 2.11 | 2.16 |
| 7 | 1.73 | 2.26 | 2.34 | 2.44 | 2.54 |
| 8 | 2.77 | 4.11 | 4.27 | 4.55 | 4.57 |

That which is claimed is:

1. A composition consisting essentially of the product obtained by combining
   (a) 100 parts by weight boric acid, (b) 100 to 300 parts by weight polyhydroxy alcohol selected from the group consisting of ethylene glycol and glycerol, and
(c) 10 to 400 parts of filler.

2. The composition of claim 1 in which the polyhydroxy alcohol is ethylene glycol.

3. The composition of claim 1 in which the polyhydroxy alcohol is glycerol.

4. The composition of claim 1 in which the polyhydroxy alcohol is a mixture of ethylene glycol and glycerol.

5. The composition of claim 2, 3, or 4 in which the filler is fume silica.

6. A process for producing an improved handling silicone elastomer stock comprising shearing a mixture until a homogeneous stock is formed, said mixture comprising 100 parts by weight of a silicone elastomer base having a Williams plasticity greater than 0.5 mm, from 0.1 to 1.0 part by weight of the composition of claim 1, and an amount of an organic peroxide catalyst sufficient to vulcanize the silicone elastomer base.

7. A process for producing an improved handling silicone elastomer stock comprising shearing a mixture until a homogeneous stock is formed, said mixture comprising 100 parts by weight of a silicone elastomer base comprising a polydiorganosiloxane gum having a Williams plasticity greater than 0.5 mm, a reinforcing silica filler, and an anti-crepe aging material; from 0.1 to 0.5 part by weight of the composition of claim 1; and a suitable amount of an organic peroxide catalyst for the silicone elastomer base.

8. The cured silicone elastomer obtained by heating the homogeneous stock of claim 6 or 7 to a point above the activation temperature of the organic peroxide catalyst.

* * * * *